(12) United States Patent
Ohno et al.

(10) Patent No.: US 10,946,481 B2
(45) Date of Patent: Mar. 16, 2021

(54) LASER PROCESSING DEVICE

(71) Applicant: Kabushiki Kaisha Toshiba, Minato-ku (JP)

(72) Inventors: Hiroshi Ohno, Yokohama (JP); Kota Nomura, Yokohama (JP); Tetsuo Sakai, Taito (JP); Itaru Chida, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 680 days.

(21) Appl. No.: 15/696,909

(22) Filed: Sep. 6, 2017

(65) Prior Publication Data

US 2018/0071863 A1 Mar. 15, 2018

(30) Foreign Application Priority Data

Sep. 14, 2016 (JP) .............................. JP2016-179165

(51) Int. Cl.
*B23K 26/356* (2014.01)
*B23K 26/10* (2006.01)
(Continued)

(52) U.S. Cl.
CPC ........ *B23K 26/356* (2015.10); *B23K 26/0643* (2013.01); *B23K 26/0665* (2013.01);
(Continued)

(58) Field of Classification Search
CPC ............................ B23K 26/356; B23K 26/0643; B23K 26/106; B23K 26/0665; G02B 6/262; G02B 19/0014; G02B 19/0047
See application file for complete search history.

(56) References Cited

U.S. PATENT DOCUMENTS

2003/0196996 A1 10/2003 Jennings et al.
2004/0226928 A1* 11/2004 Westley ............... B23K 26/066
219/121.85
(Continued)

FOREIGN PATENT DOCUMENTS

DE 196 18 149 A1 11/1997
JP 48-677 B 1/1973
(Continued)

*Primary Examiner* — Brian W Jennison
(74) *Attorney, Agent, or Firm* — Oblon, McClelland, Maier & Neustadt, L.L.P.

(57) ABSTRACT

According to one embodiment, a laser processing device includes a light irradiation section, and an optical element. The optical element includes a first transparent member provided via a gap with a tip of the light irradiation section, and a second transparent member. The first transparent member includes a first surface opposed to the tip of the light irradiation section, and a second surface provided so as to be connected to the first surface. The second transparent member includes a flat surface and a convex surface, the flat surface being provided so as to be opposed to the second surface of the first transparent member, the light passed through the first transparent member passing through the convex surface. An optical axis of the laser beam passing through the first surface and an optical axis passing through the convex surface are different from each other.

11 Claims, 7 Drawing Sheets

(51) Int. Cl.
  *B23K 26/06* (2014.01)
  *C21D 10/00* (2006.01)
  *G02B 6/26* (2006.01)
  *G02B 19/00* (2006.01)
  *G21C 21/00* (2006.01)

(52) U.S. Cl.
  CPC .......... *B23K 26/106* (2013.01); *C21D 10/005* (2013.01); *G02B 6/262* (2013.01); *G02B 19/0014* (2013.01); *G02B 19/0047* (2013.01); *G21C 21/00* (2013.01)

(56) References Cited

U.S. PATENT DOCUMENTS

| | | | |
|---|---|---|---|
| 2007/0114214 A1* | 5/2007 | Jennings | B23K 26/04 219/121.83 |
| 2012/0074110 A1* | 3/2012 | Zediker | B08B 7/0042 219/121.72 |
| 2012/0205347 A1* | 8/2012 | Jennings | B23K 26/032 219/121.8 |
| 2015/0138127 A1 | 5/2015 | Nomura et al. | |
| 2016/0138127 A1* | 5/2016 | Nomura | C21D 7/04 72/56 |

FOREIGN PATENT DOCUMENTS

| | | |
|---|---|---|
| JP | 4-313711 A | 11/1992 |
| JP | 5-110181 A | 4/1993 |
| JP | 2004-61887 A | 2/2004 |
| JP | 2005-313191 A | 11/2005 |
| JP | 2016-93833 A | 5/2016 |

* cited by examiner

LASER PROCESSING DEVICE

CROSS-REFERENCE TO RELATED APPLICATIONS

This application is based upon and claims the benefit of priority from Japanese Patent Application No. 2016-179165, filed on Sep. 14, 2016; the entire contents of which are incorporated herein by reference.

FIELD

Embodiments of the invention generally relate to a laser processing device.

BACKGROUND

It is possible for a laser beam to concentrate high density light energy on a narrow area. Therefore, processing with a laser beam is used in a wide variety of fields such as the nuclear field. As the processing technology with the laser beam, there can be cited laser peening for irradiating a metal surface in water with the laser beam to change the composition of the metal surface using a shock wave of the plasma generated by the irradiation with the laser beam. The laser peening is applied to a structure in a nuclear reactor, and relaxes the stress in the structure to prevent corrosion fractures.

In the laser peening, the laser beam is reflected by an optical element such as a mirror to converge the laser beam on the metal surface. Such an optical element is apt to be affected by an ultrasonic wave generated on the metal surface by the plasma. Thus, there is a problem that the optical element is damaged.

DETAILED DESCRIPTION

According to one embodiment, a laser processing device includes a light irradiation section, and an optical element. The light irradiation section is adapted to emit a laser beam from a light source from a tip. The optical element includes a first transparent member provided via a gap with the tip of the light irradiation section, and a second transparent member. The first transparent member includes a first surface opposed to the tip of the light irradiation section, and a second surface provided so as to be connected to the first surface. The second transparent member includes a flat surface and a convex surface, the flat surface being provided so as to be opposed to the second surface of the first transparent member, the light passed through the first transparent member passing through the convex surface. An optical axis of the laser beam passing through the first surface and an optical axis passing through the convex surface are different from each other.

Embodiments of the invention will now be described with reference to the drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described thereinabove are marked with like reference numerals, and a detailed description is omitted as appropriate.

First Embodiment

Figure 1:
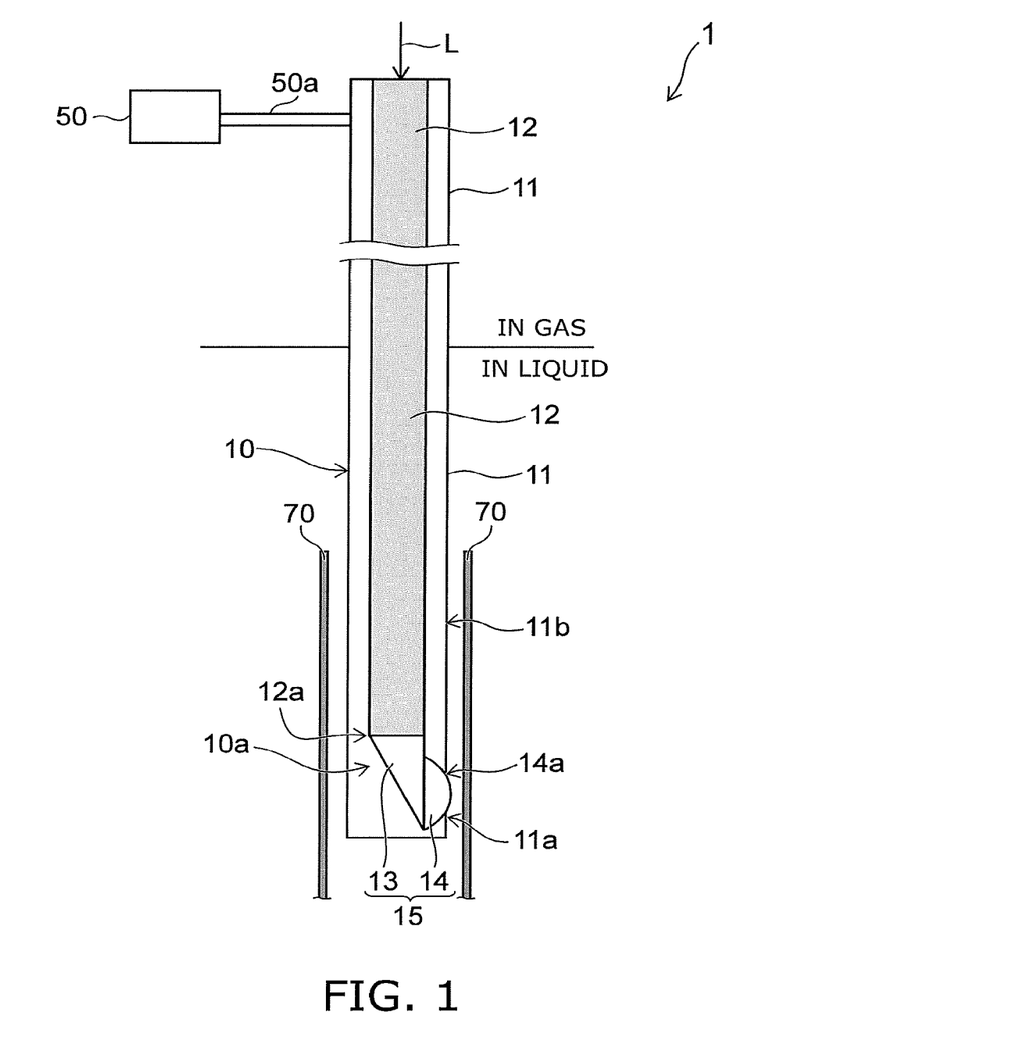
FIG. 1 is a schematic diagram showing a laser processing device according to a first embodiment.

FIG. 1 is a schematic diagram showing a laser processing device according to a first embodiment.

Figure 2:
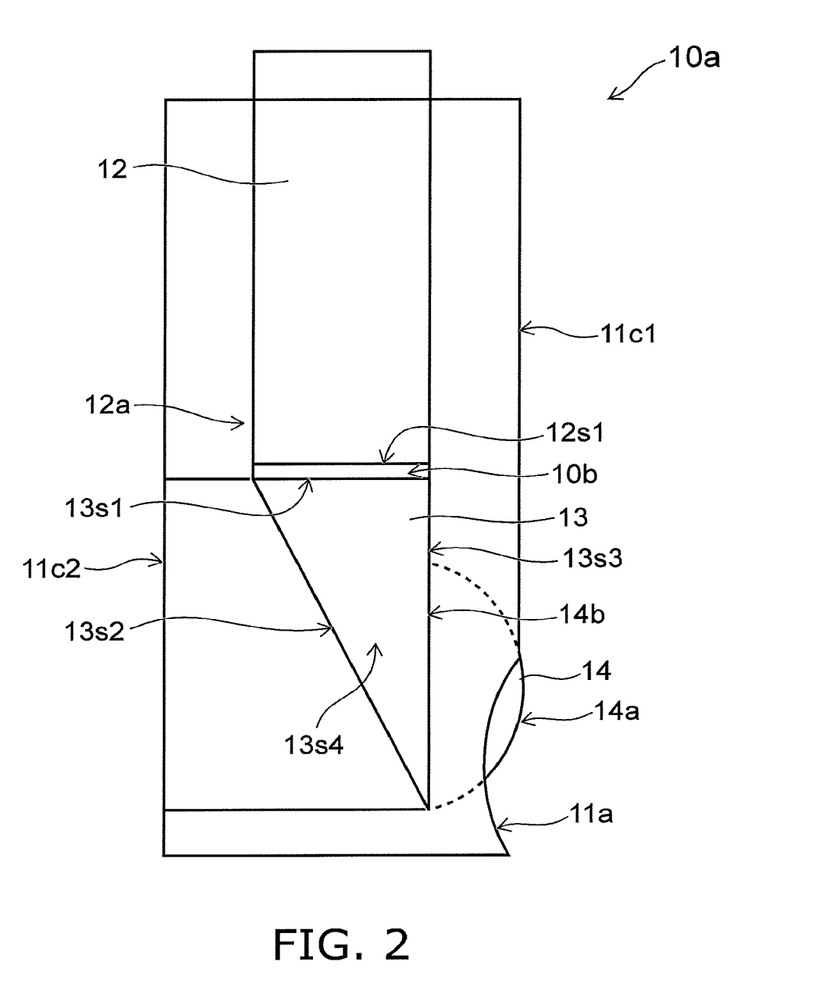
FIG. 2 is a partial enlarged view of FIG. 1.

FIG. 2 is a partial enlarged view of FIG. 1.

Figure 3:
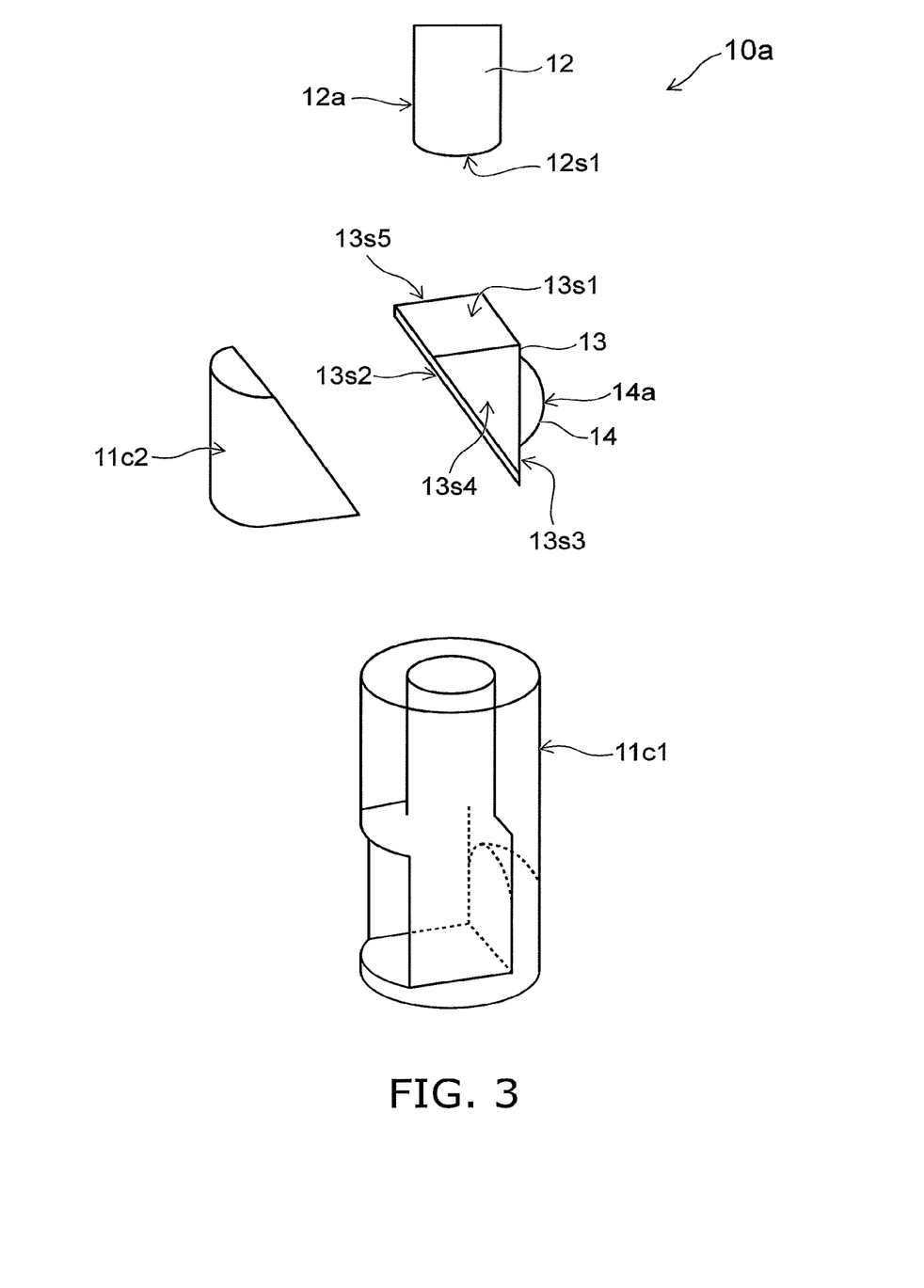
FIG. 3 is an exploded perspective view of FIG. 2.

FIG. 3 is an exploded perspective view of FIG. 2.

FIG. 1 shows the laser processing device 1. FIG. 2 shows an irradiation part 10*a* of a main body part 10 in the laser processing device 1. FIG. 3 shows elements constituting the irradiation part 10*a*.

As shown in FIG. 1, the laser processing device 1 is provided with the main body part 10 and a drive section 50. The laser processing device 1 is a device for performing the laser peening on, for example, a pipe 70 as a processing object. The main body part 10 of the laser processing device 1 is inserted in the pipe 70 having a hollow cylindrical shape.

The laser peening denotes a processing technology using a laser such as a YAG laser. The laser beam is converged using an optical element such as a lens, and a metal surface is irradiated with the laser beam thus converged to thereby generate plasma, and thus, compressive stress is provided inside the metal due to a shock wave of the plasma. By removing tensile stress remaining inside the metal to relax the stress using the laser peening, corrosion fractures of the metal are prevented. Such laser peening is applied to, for example, a structure in a nuclear reactor.

The main body part 10 is provided with a housing 11, an optical fiber 12 (a light irradiation section), a prism 13 and a lens 14. The housing 11 has a hollow cylindrical shape, and houses the optical fiber 12, the prism 13 and the lens 14 inside. The housing 11 is formed of, for example, metal. The housing 11 is provided with an opening 11*a* for exposing a convex surface 14*a* of the lens 14. A part of an outer wall surface 11*b* of the housing 11 is surrounded by the pipe 70.

The optical fiber 12 has an end part 12*a* (a tip). A laser beam L from a laser source (not shown) is emitted from the end part 12*a*. For example, the laser beam L is a short-pulse laser beam with the pulse width equal to or shorter than 100 (ns).

The prism 13 is a structure formed of a plurality of surfaces. The prism 13 is a prism having a surface (a side surface 13*s*2) tilted at a predetermined angle, and is, for example, a tapered prism. The prism 13 is disposed so as to be opposed to the optical fiber 12. The prism 13 is formed of, for example, sapphire. The prism 13 can also be formed of quartz or glass. The prism 13 refracts the laser beam L from the end part 12*a* of the optical fiber 12, and then internally reflects to transmit the laser beam L to the lens 14.

The lens 14 is disposed on the prism 13. For example, the lens 14 adheres to the prism 13. The lens 14 and the prism 13 are not required to adhere to each other, but can also be provided with a gap in between. In that case, there is obtained an advantage that it is possible for the lens 14 to micro-vibrate to thereby absorb a potential shock wave received by the lens 14 during processing. The lens 14 is, for example, a planoconvex lens. For example, the lens 14 is a planoconvex lens having a convex surface 14a as a curved surface. The lens 14 is formed of, for example, sapphire, quartz or glass. The lens 14 is formed of, for example, the same material as the material, which the prism 13 is formed of, and integrally with the prism 13. The lens 14 refracts and then converges the laser beam L, which has been transmitted using the internal reflection of the prism 13.

An optical element 15 is formed of the prism 13 and the lens 14 as transparent members.

As shown in FIG. 2 and FIG. 3, the end part 12a of the optical fiber 12, the prism 13 and the lens 14 constitute the irradiation part 10a of the main body part 10. The housing 11 has a holding part 11c1 and a cover part 11c2. The irradiation part 10a of the main body part 10 is housed by the holding part 11c1 and the cover part 11c2 of the housing 11. For example, the irradiation part 10a (the end part 12a of the optical fiber 12, the prism 13 and the lens 14) of the main body part 10 is fixed by the holding part 11c1 and the cover part 11c2 of the housing 11.

The end part 12a of the optical fiber 12 has an exit surface 12s1. The laser beam L is emitted at a plurality of points on the exit surface 12s1.

The prism 13 has a bottom surface 13s1, the side surface 13s2, a side surface 13s3, a side surface 13s4 and a side surface 13s5. For example, the shapes of the bottom surface 13s1, the side surface 13s2 and the side surface 13s3 are each a quadrangle, and the shapes of the side surface 13s4 and the side surface 13s5 are each a triangle.

The bottom surface 13s1 is opposed to the exit surface 12s1 of the end part 12a via a gap 10b, and refracts the laser beams L emitted from the plurality of points of the exit surface 12s1. Since the gap 10b is formed between the exit surface 12s1 and the bottom surface 13s1, damages of the optical fiber 12 and the optical element 15 (the prism 13 and the lens 14) can be suppressed compared to the case in which the optical fiber 12 and the prism 13 have contact with each other. It should be noted that it is also possible to bond the exit surface 12s1 and the bottom surface 13s1 to each other so as to allow the exit surface 12s1 and the bottom surface 13s1 to micro-vibrate.

The side surface 13s2 is a surface tilted at a predetermined angle with the side surface 13s3. The side surface 13s2 internally reflects the laser beam L transmitted from the bottom surface 13s1 through the inside of the prism 13. The laser beam L internally reflected by the side surface 13s2 is transmitted to the lens 14 via the side surface 13s3.

In the case in which the lens 14 is a planoconvex lens, a flat surface 14b of the lens 14 is located on the side surface 13s3. It should be noted that in the case in which the prism 13 and the lens 14 are formed of the same material integrally with each other, the laser beam L is not refracted by the flat surface 14b of the lens 14.

The convex surface 14a of the lens 14 refracts to converge the laser beam L. Here, the convex surface 14a of the lens 14 is disposed so that the light internally propagating the prism 13 passes (is transmitted) through the convex surface 14a.

As shown in FIG. 1, the drive section 50 is a drive device for moving the main body part 10 in up and down directions, and rotating the main body part 10. The drive section 50 is connected to the main body part 10 via a connection part 50a.

For example, the drive section 50 moves the housing 11 housing the optical fiber 12, the prism 13 and the lens 14 in the up and down directions to thereby move the main body part 10 in the up and down directions.

For example, by providing the housing 11 with a rotating part having a hollow cylindrical shape and a support part disposed in the periphery of the rotating part and rotatably supporting the rotating part, the drive section 50 rotates the housing 11 to thereby rotate the main body part 10.

It should be noted that in the specification, the "up direction" denotes a direction from the bottom surface 13s1 of the prism 13 toward the exit surface 12s1 of the optical fiber 12, and the "down direction" denotes a direction from the exit surface 12s1 of the optical fiber 12 toward the bottom surface 13s1 of the prism 13.

In the case of performing the laser peening, by the drive section 50 driving the main body part 10, the position of the irradiation part 10a of the main body part 10 relative to the pipe 70 is adjusted. For example, in the case in which the main body part 10 is embedded in the pipe 70, by moving the main body part 10 in the up direction and rotating the main body part 10 in the vertical direction (e.g., a vertical direction with respect to the drawing), the position of the irradiation part 10a relative to the pipe 70 is adjusted. In other words, the positions of the optical fiber 12, the prism 13 and the lens 14 relative to the pipe 70 are adjusted. Then, the laser peening is performed on the processing part of the pipe 70 in the state in which a part of the main body part 10 including the irradiation part 10a and the pipe 70 are located in a liquid such as water.

The laser peening by the laser processing device 1 will hereinafter be described.

Figure 4:
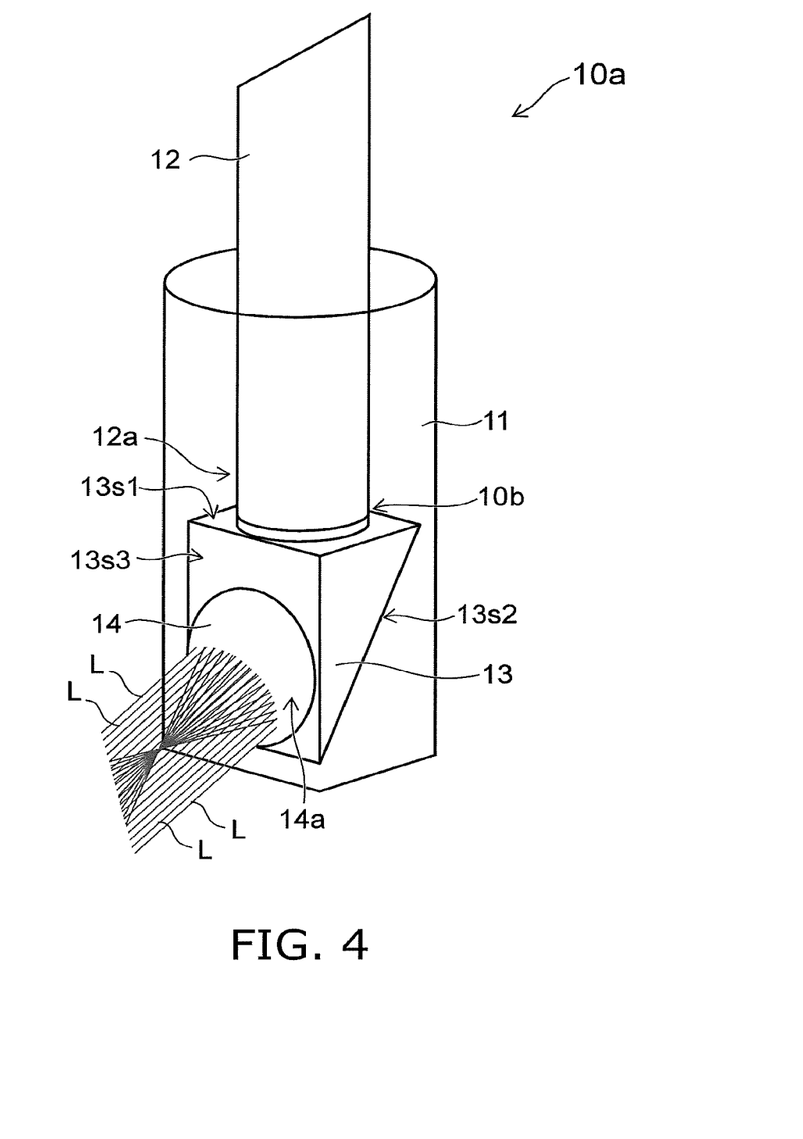
FIG. 4 is an enlarged view of a part of the laser processing device according to the first embodiment.

FIG. 4 is an enlarged view of a part of the laser processing device according to the first embodiment.

Figure 5:
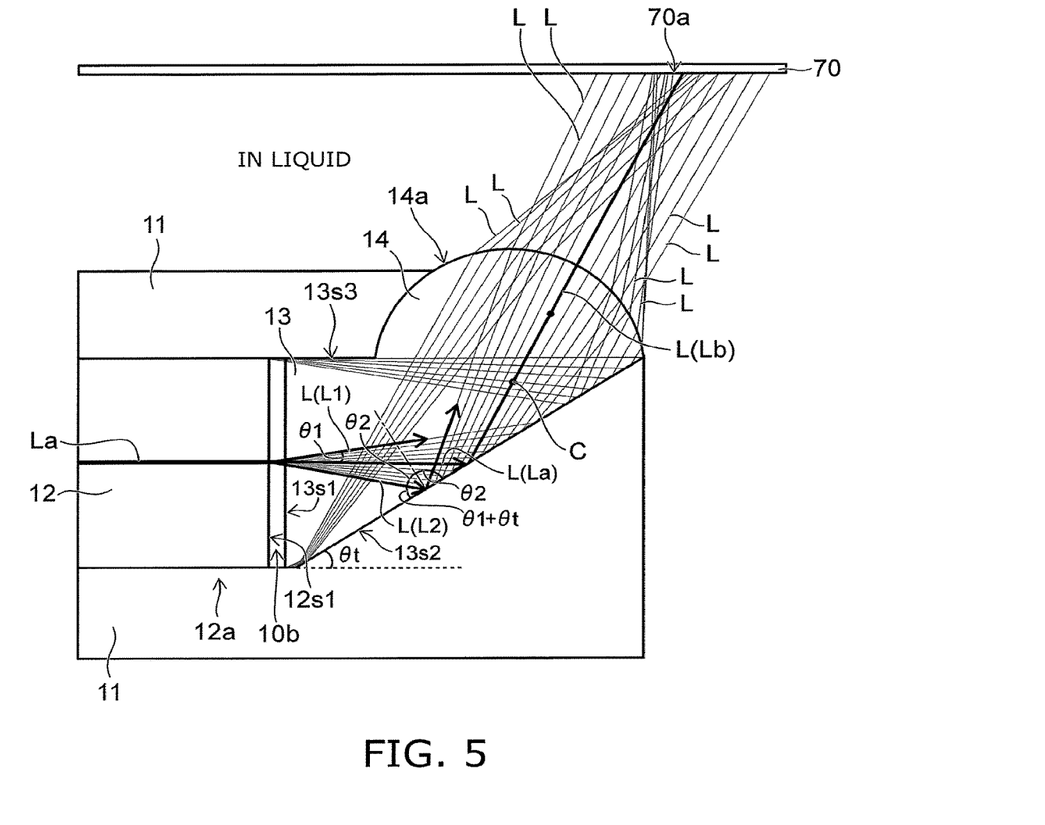
FIG. 5 is a diagram showing a configuration of converging the laser beam using the laser processing device according to the first embodiment.

FIG. 5 is a diagram showing a configuration of converging the laser beam using the laser processing device according to the first embodiment.

FIG. 4 shows a perspective view of the irradiation part 10a of the main body part 10. FIG. 5 is a diagram for exemplifying transmission of the laser beam L in the irradiation part 10a.

As shown in FIG. 4, the laser beam L emitted from the optical fiber 12 is transmitted inside the prism 13 and the lens 14 to thereby be converged.

As shown in FIG. 5, firstly, in a plurality of points on the exit surface 12s1 of the end part 12a, the laser beams L are emitted with the spread angle NA. The laser beams L are transmitted through the gap 10b, and are then refracted by the bottom surface 13s1 of the prism 13. Here, in accordance with the Snell's law, defining the refracting angle on the bottom surface 13s1 as θ1, and the refractive index of the laser beam L with respect to the material (e.g., sapphire) of the prism 13 as n, the refracting angle θ1 can be derived from the formula (1) below. It should be noted that in the formula described below, a (arc) is a symbol representing an inverse trigonometric function.

$$\theta1 = a\ \sin(NA/n) \quad (1)$$

Next, the laser beams L are transmitted to the side surface 13s2 of the prism 13. For example, in order for the laser beam L1 to be transmitted to the side surface 13s2, the refracting angle θ1 fulfills the formula (2) below defining the tilt angle (the taper angle) of the side surface 13s2 with respect to the optical axis La emitted from the optical fiber 12 as θt.

$$\theta1 = a\sin(NA/n) \le t \quad (2)$$

Next, the laser beams L are internally reflected by the side surface 13s2 of the prism 13. For example, in the case in which the laser beam L2 is internally reflected by the side surface 13s2, defining the reflection angle on the side surface 13s2 as θ2, the reflection angle θ2 can be derived from the formula (3) below.

$$\theta2 = 90 - \theta1 - \theta t \quad (3)$$

Further, defining the refractive index of the laser beam L with respect to the external environment as n0, the critical angle θc inherent to the material of the prism 13 can be derived from the formula (4) below. It should be noted that the refractive index n0 of the laser beam L with respect to the external environment is the refractive index of the laser beam L with respect to a liquid such as water.

$$\theta c = a\sin(n0/n) \quad (4)$$

Here, in order for the laser beam L2 to be totally reflected by the side surface 13s2, the reflection angle θ2 fulfills the formula (5) below.

$$\theta2 \ge \theta c \quad (5)$$

The formula (6) below can be derived from the formula (3) and the formula (5) described above.

$$90 - \theta1 - \theta t \ge \theta c \quad (6)$$

According to the formula (1), the formula (2), the formula (4) and the formula (6) described above, it results that tilt angle θt fulfills the formula (7) below.

$$a\sin(NA/n) \le \theta t \le 90 - a\sin(NA/n) - a\sin(n0/n) \quad (7)$$

Next, the laser beams L are transmitted to the lens 14 via the side surface 13s3, and are refracted and converged by the convex surface 14a of the lens 14. In the case in which the convex surface 14a is a curved surface, the curvature center C of the convex surface 14a is located on the optical axis Lb of the laser beam L reflected by the side surface 13s2. Thus, the processing part 70a of the pipe 70 located in the vicinity of the converging point of the laser beam L is processed. It should be noted that in the example shown in FIG. 5, the converging point of the laser beam L does not coincide with the processing part 70a of the pipe 70. In other words, the converging point of the laser beam L does not coincide with the processing point. The converging point of the laser beam L can also coincide with the processing part 70a of the pipe 70.

Advantages of the embodiment will hereinafter be described.

In the laser peening of the laser processing device having the optical fiber and the mirror disposed so as to be opposed to each other, the laser beam emitted from the end part of the optical fiber is made to be reflected by the reflecting surface of the mirror to thereby converge on the pipe. Such a mirror of the laser processing device is configured by providing a dielectric film on an electrically conductive material including metal. Since the processing part of the pipe on which the laser beam converges is located between the optical fiber and the mirror, the reflecting surface formed of the dielectric film is apt to be affected by the shock wave of the plasma generated in the processing part. Further, since there is induced generation of the ultrasonic wave originated from the processing part as a sound source due to the plasma, the reflecting surface of the mirror is apt to be affected by the ultrasonic wave. Therefore, due to the shock wave of the plasma and the ultrasonic wave, the dielectric film of the reflecting surface becomes apt to be damaged.

The laser processing device 1 of the embodiment has the optical element 15 provided via the gap 10b located between the optical fiber 12 and the optical element 15, and formed of the prism 13 and the lens 14. Due to such an optical element 15, it is possible to perform the laser peening using the laser processing device 1 without forming the mirror. Therefore, it is possible to suppress damages of the optical element 15 compared to the laser processing device having the mirror. Further, since the gap 10b is provided, it is possible for the optical element 15 to micro-vibrate when receiving the shock wave of the plasma. Therefore, due to the microvibration of the optical element 15, the shock wave can be absorbed. In contrast, in the case in which the gap 10b is not provided, the shock wave propagates to the tip of the optical fiber 12 to cause the damage in the tip part. The gap 10b can also be filled with a transparent material having such elasticity as to be able to absorb a shock. In this case, the shock can also be absorbed. The elastic transparent material can transmit the laser beam L. For example, transparent silicone or transparent resin can be adopted.

Further, in the case in which the gap 10b is provided, it is possible to refract the laser beam L as expressed by the formula (1) using the bottom surface 13s1 of the prism 13. Regarding the convergence of the laser, it is known that the larger the number of lens surfaces is, the higher the light-converging power becomes. Therefore, by providing the gap 10b, it is possible to enhance the light-converging power for the laser.

By adopting the configuration described hereinabove, it is possible to tilt the optical axis of the laser beam L passing through the bottom surface 13s1 and the optical axis of the laser beam L passing through the convex surface 14a of the lens 14 from each other. Thus, it becomes possible to perform the laser peening process on the area tilted with respect to the optical axis of the optical fiber 12. For example, there is an advantage that it is possible to perform the laser processing on a wall surface of a narrow space, which is too narrow to change the posture of the optical fiber 12 inserted in the narrow space.

According to the embodiment, there is provided a laser processing device for preventing the damage of the optical element.

Second Embodiment

Figure 6:
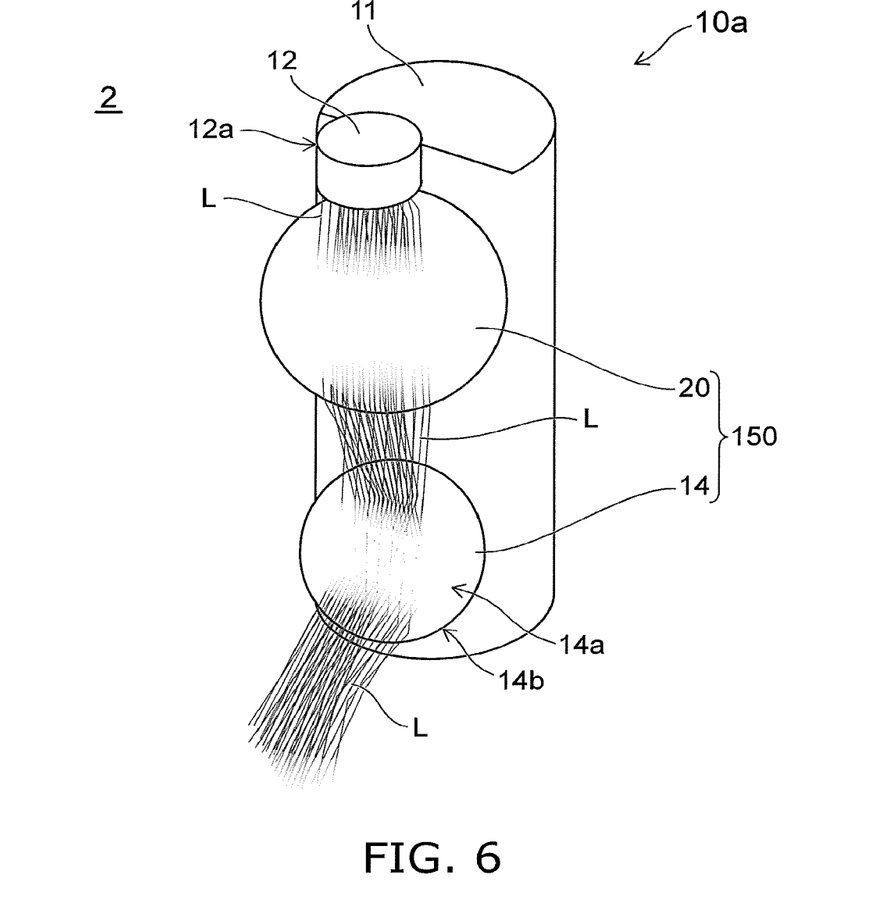
FIG. 6 is an enlarged view of a part of a laser processing device according to a second embodiment.

FIG. 6 is an enlarged view of a part of a laser processing device according to a second embodiment.

In FIG. 6, there is shown the irradiation part 10a of the main body part 10 in a transmissive manner.

The laser processing device 2 according to the embodiment is different from the laser processing device 1 according to the first embodiment in the point of providing an optical element 150 formed of the lens 14 and a lens 20. The other constituents are the same as those of the first embodiment, and therefore, the detailed description will be omitted.

As shown in FIG. 6, the end part 12a of the optical fiber 12, the lens 20 and the lens 14 constitute the irradiation part 10a of the main body part 10. Further, the optical element 150 is formed of the lens 14 and the lens 20 as transparent members.

The lens 20 is, for example, a ball lens having a spherical shape. The lens 20 is provided so as to be opposed to the end part 12a of the optical fiber 12. The lens 20 is formed of, for example, sapphire, quartz or glass. The lens 20 refracts the laser beam L from the end part 12a of the optical fiber 12, and then transmits the laser beam L to the lens 14. For example, the laser beam L is adjusted by the lens 20 to become parallel light.

The lens 14 is provided so that the lens 20 is positioned between the lens 14 and the end part 12a of the optical fiber 12. In other words, the lens 14 is located below the lens 20. The lens 14 is a planoconvex lens having the convex surface 14a and the flat surface 14b. The lens 14 refracts the laser beam L transmitted from the lens 20 with the convex surface 14a, and then reflects the laser beam L with the flat surface 14b. Further, the lens 14 refracts and then converges the laser beam L, which has been reflected by the flat surface 14b, with the convex surface 14a.

The laser peening by the laser processing device 2 will hereinafter be described.

Figure 7:
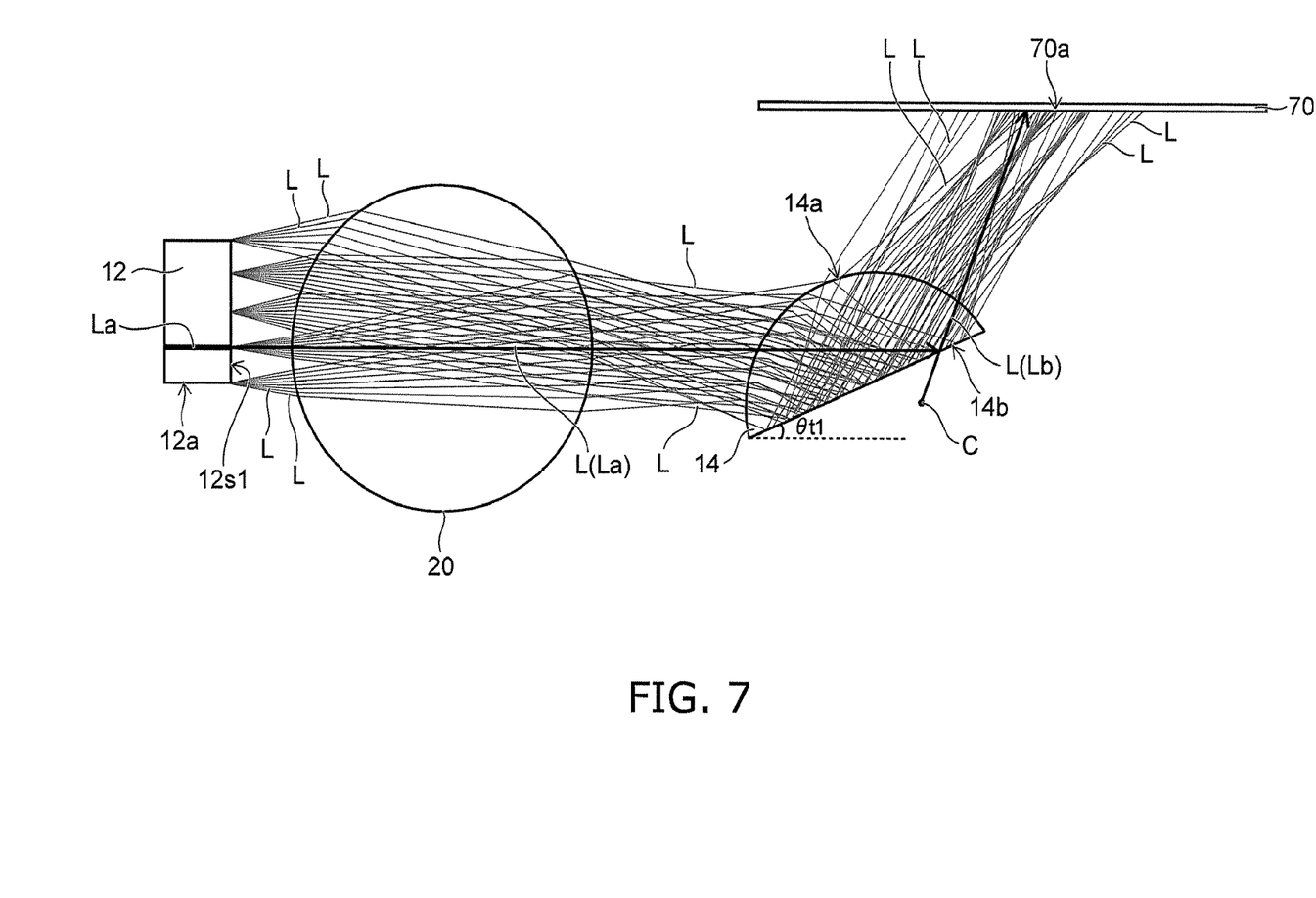
FIG. 7 is a diagram showing a configuration of converging the laser beam using the laser processing device according to the second embodiment.

FIG. 7 is a diagram showing a configuration of converging the laser beam using the laser processing device according to the second embodiment.

It should be noted that in FIG. 7, there are shown the end part 12a of the optical fiber 12, the lens 20, the lens 14 and the pipe 70.

As shown in FIG. 7, firstly, in a plurality of points on the exit surface 12s1 of the end part 12a, the laser beams L are emitted. The laser beams L are refracted and transmitted to the lens 14 by the lens 20. Subsequently, the laser beams L are refracted and transmitted to the flat surface 14b of the lens 14 by the convex surface 14a of the lens 14.

Next, the laser beams L are internally reflected and transmitted to the convex surface 14a of the lens 14 by the flat surface 14b of the lens 14. Subsequently, the laser beams L are refracted and converged by the convex surface 14a of the lens 14. In the case in which the convex surface 14a is a curved surface, the curvature center C of the convex surface 14a is located on the optical axis Lb of the laser beam L reflected by the flat surface 14b. Thus, the processing part 70a of the pipe 70 located in the vicinity of the converging point of the laser beam L is processed.

Further, defining the spread angle of the laser beams L as NA, the refractive index of the laser beam L with respect to the material (e.g., sapphire) of the lens 14 as n, and the refractive index of the laser beam L with respect to the external environment (e.g., a liquid such as water) as n0, the tilt angle θt1 of the flat surface 14b of the lens 14 with respect to the optical axis La emitted from the optical fiber 12 fulfills the formula (8) below.

$$a \sin(NA/n) \leq \theta t1 \leq 90 - a \sin(NA/n) - a \sin(n0/n) \quad (8)$$

Advantages of the embodiment will hereinafter be described.

The laser processing device 2 according to the embodiment has the optical element 150 formed of the lens 14 and the lens 20. Due to such an optical element 150, it is possible to perform the laser peening using the laser processing device 2 without forming the mirror. Therefore, it is possible to suppress damages of the optical element 150 compared to the laser processing device having the mirror.

Further, in the embodiment, since the lens 20 is located between the optical fiber 12 and the lens 14, the optical element 150 can easily be installed and processed in the irradiation part 10a of the main body part 10.

According to the embodiment, there is provided a laser processing device for preventing the damage of the optical element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A laser processing device comprising:
a light irradiation section adapted to emit a laser beam from a light source from a tip;
an optical element including a first transparent member provided via a gap with the tip of the light irradiation section, and a second transparent member; and
a third transparent member filling the gap and adapted to absorb a shock,
the first transparent member including a first surface opposed to the tip of the light irradiation section, and a second surface provided so as to be connected to the first surface,
the second transparent member including a flat surface and a convex surface, the flat surface being provided so as to be opposed to the second surface of the first transparent member, the light passed through the first transparent member passing through the convex surface, and
an optical axis of the laser beam passing through the first surface and an optical axis passing through the convex surface being different from each other.

2. The device according to claim 1, wherein
the first transparent member further includes a third surface provided so as to be connected to the first surface and tilted at a predetermined angle with the second surface,
the laser beam emitted from the light irradiation section is transmitted into the first transparent member via the first surface, and
the laser beam in the first transparent member is reflected by the third surface and is transmitted to the second surface.

3. The device according to claim 2, wherein
the convex surface is a curved surface, and
a curvature center of the convex surface is located on an optical axis of the laser beam reflected by the third surface.

4. The device according to claim 2, further comprising:
a housing adapted to house the optical element,
wherein the laser beam emitted from the light irradiation section is converged on a pipe disposed via water on a periphery of the housing, and
defining a spread angle of the laser beam emitted from the irradiation section as NA, a refractive index of the laser beam with respect to the first transparent member as n, and a refractive index of the laser beam with respect to the water as n0, a tilt angle θt of the third surface with respect to an optical axis of the laser beam emitted from the light irradiation section fulfills the following formula:

$$a \sin(NA/n) \leq \theta \leq 90 - a \sin(NA/n) - a \sin(n0/n).$$

5. The device according to claim 1, wherein
the first transparent member is a prism, and
the second transparent member is a lens.

6. The device according to claim 1, wherein
the third transparent member includes one of silicone and resin.

7. The device according to claim 1, wherein the second surface of the first transparent member adheres to the flat surface of the second transparent member.

8. The device according to claim 1, wherein The flat surface of the second transparent member is opposed to the second surface of the first transparent member via a gap.

9. The device according to claim 1, wherein the first transparent member includes a same material as a material of the second transparent member, and is formed integrally with the second transparent member.

10. The device according to claim 1, further comprising:
a housing adapted to house the optical element, and provided with an opening through which the convex surface is exposed,
wherein the laser beam emitted from the light irradiation section is converged on a pipe disposed on a periphery of the housing, via the convex surface.

11. The device according to claim 10, further comprising:
a drive section adapted to move the housing in a first direction from tip of the light irradiation section toward the first surface of the first transparent member and a second direction opposite to the first direction, and rotate the housing.

* * * * *